(12) United States Patent
Nakae

(10) Patent No.: US 9,503,327 B2
(45) Date of Patent: Nov. 22, 2016

(54) FILTERING SETTING SUPPORT DEVICE, FILTERING SETTING SUPPORT METHOD, AND MEDIUM

(71) Applicant: NEC CORPORATION, Tokyo (JP)

(72) Inventor: Masayuki Nakae, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/414,542

(22) PCT Filed: Jul. 23, 2013

(86) PCT No.: PCT/JP2013/069873
§ 371 (c)(1),
(2) Date: Jan. 13, 2015

(87) PCT Pub. No.: WO2014/017467
PCT Pub. Date: Jan. 30, 2014

(65) Prior Publication Data
US 2015/0172129 A1  Jun. 18, 2015

(30) Foreign Application Priority Data

Jul. 24, 2012 (JP) .................................. 2012-163960

(51) Int. Cl.
H04L 12/24 (2006.01)
H04L 29/06 (2006.01)

(52) U.S. Cl.
CPC .......... *H04L 41/12* (2013.01); *H04L 41/0883* (2013.01); *H04L 41/0893* (2013.01); *H04L 41/142* (2013.01); *H04L 63/0263* (2013.01)

(58) Field of Classification Search
CPC . H04L 41/12; H04L 41/142; H04L 41/0893; H04L 63/0263
See application file for complete search history.

(56) References Cited

U.S. PATENT DOCUMENTS 6,496,935 B1 * 12/2002 Fink .................... H04L 63/0254
370/451
6,594,268 B1 * 7/2003 Aukia ..................... H04L 45/04
370/230

(Continued)

FOREIGN PATENT DOCUMENTS

JP  2004-342072  12/2004
JP  2006-040247  2/2006

(Continued)

OTHER PUBLICATIONS

International Search Report, PCT/JP2013,069873, Oct. 29, 2013.

*Primary Examiner* — Andrew Lai
*Assistant Examiner* — Chuong M Nguyen
(74) *Attorney, Agent, or Firm* — Young & Thompson

(57) ABSTRACT

In a filtering setting support device, a logical/physical mapping section generates mapping information that represents a path on the layout of a network by a combination of start nodes and end nodes, the path being, for each flow identifier, from a transmission source node to a destination node, based on node physical layout information and access policy information. The access policy information manages flow information including a combination of transmission source node and destination node, by attaching a flow identifier. A filtering point analysis section specifies as a filtering point a node where a plurality of flows are co-present. A common formal rule generating section generates common formal rules that are to be set at the filtering point. A common formal rule output section presents common formal rules to a network administrator.

19 Claims, 18 Drawing Sheets

(56) References Cited

U.S. PATENT DOCUMENTS

| | | | |
|---|---|---|---|
| 6,598,034 B1* | 7/2003 | Kloth | H04L 12/2602 |
| | | | 370/338 |
| 7,739,722 B2 | 6/2010 | Okajo et al. | |
| 7,801,060 B2 | 9/2010 | Sumiyoshi et al. | |
| 7,882,537 B2 | 2/2011 | Okajo et al. | |
| 8,295,198 B2 | 10/2012 | Newman | |
| 9,178,850 B2* | 11/2015 | Lain | H04L 45/02 |
| 2004/0215978 A1 | 10/2004 | Okajo et al. | |
| 2005/0283823 A1 | 12/2005 | Okajo et al. | |
| 2007/0076634 A1 | 4/2007 | Sumiyoshi et al. | |
| 2007/0110046 A1* | 5/2007 | Farrell | H04L 69/04 |
| | | | 370/389 |
| 2009/0154348 A1 | 6/2009 | New Man | |
| 2011/0002339 A1 | 1/2011 | Fok et al. | |
| 2011/0214157 A1* | 9/2011 | Korsunsky | G06F 21/55 |
| | | | 726/1 |

FOREIGN PATENT DOCUMENTS

| | | |
|---|---|---|
| JP | 2007-104350 | 4/2007 |
| JP | 2007-336430 | 12/2007 |
| JP | 2008-502192 | 1/2008 |
| JP | 2011-507453 | 3/2011 |
| JP | 2011-517862 | 6/2011 |
| WO | WO 2008/105158 | 9/2008 |

* cited by examiner

Fig.5

| START NODE ID | END NODE ID | CORRESPONDING FLOW ID |
|---|---|---|
| N01 | N02 | F01 |
| N02 | N05 | F01 |
| N02 | N04 | F01 |
| N04 | N05 | F01 |
| N03 | N04 | F02 |
| N04 | N06 | F02 |

Fig.7

| FLOW ID | LOCATION INFORMATION OF TRANSMISSION SOURCE NODE | LOCATION INFORMATION OF DESTINATION NODE |
|---|---|---|
| F01 | xxxyyy.zzz201 | xxxyyy.zzz205 |
| F02 | xxxyyy.zzz203 | xxxyyy.zzz206 |
| ... | ... | ... |

FIG. 8A

| NODE ID | ATTRIBUTE INFORMATION 1 (LOCATION INFORMATION) | ATTRIBUTE INFORMATION 2 (TYPE OF DEVICE) |
|---|---|---|
| N01 | xxxyyy.zzz201 | CLIENT PC MANUFACTURED BY COMPANY A |
| N02 | xxxyyy.zzz202 | ROUTER MANUFACTURED BY COMPANY B |
| N03 | xxxyyy.zzz203 | CLIENT PC MANUFACTURED BY COMPANY C |
| N04 | xxxyyy.zzz204 | ROUTER MANUFACTURED BY COMPANY D |
| N05 | xxxyyy.zzz205 | SEVER MANUFACTURED BY COMPANY E |
| N05 | xxxyyy.zzz206 | SEVER MANUFACTURED BY COMPANY F |

FIG. 8B

| NODE ID | ADJACENT NODE ID |
|---|---|
| N01 | N02 |
| N02 | N04 |
| N02 | N05 |
| N03 | N04 |
| N04 | N05 |
| N04 | N06 |

Fig.9

| SET P(1) | (N01, N02, N05) (N01, N02, N04, N05) |
|---|---|
| SET P(2) | (N03, N04) (N04, N06) |

Fig.11

| START NODE ID | OUTPUT ARC (F01) | OUTPUT ARC (F02) | TOTAL OUTPUT ARC |
|---|---|---|---|
| N02 | 2 | 0 | 2 |
| N04 | 1 | 1 | 2 |

Fig.13

PLEASE CONFIRM/CORRECT THAT ACCESS CONTROL RULE IN NODE 204 ALLOWS ONLY COMMUNICATION LISTED BELOW

RECOMMENDED RULE:

| LOCATION INFORMATION OF TRANSMISSION SOURCE | LOCATION INFORMATION OF DESTINATION |
|---|---|
| xxxyyy.zzz201 | xxxyyy.zzz205 |
| xxxyyy.zzz203 | xxxyyy.zzz206 |
| ... | ... |

NEXT RULE>

Fig.15

| END NODE | INPUT ARC (F01) | INPUT ARC (F02) | TOTAL INPUT ARC |
|---|---|---|---|
| N02 | 1 | 0 | 1 |
| N04 | 1 | 1 | 2 |

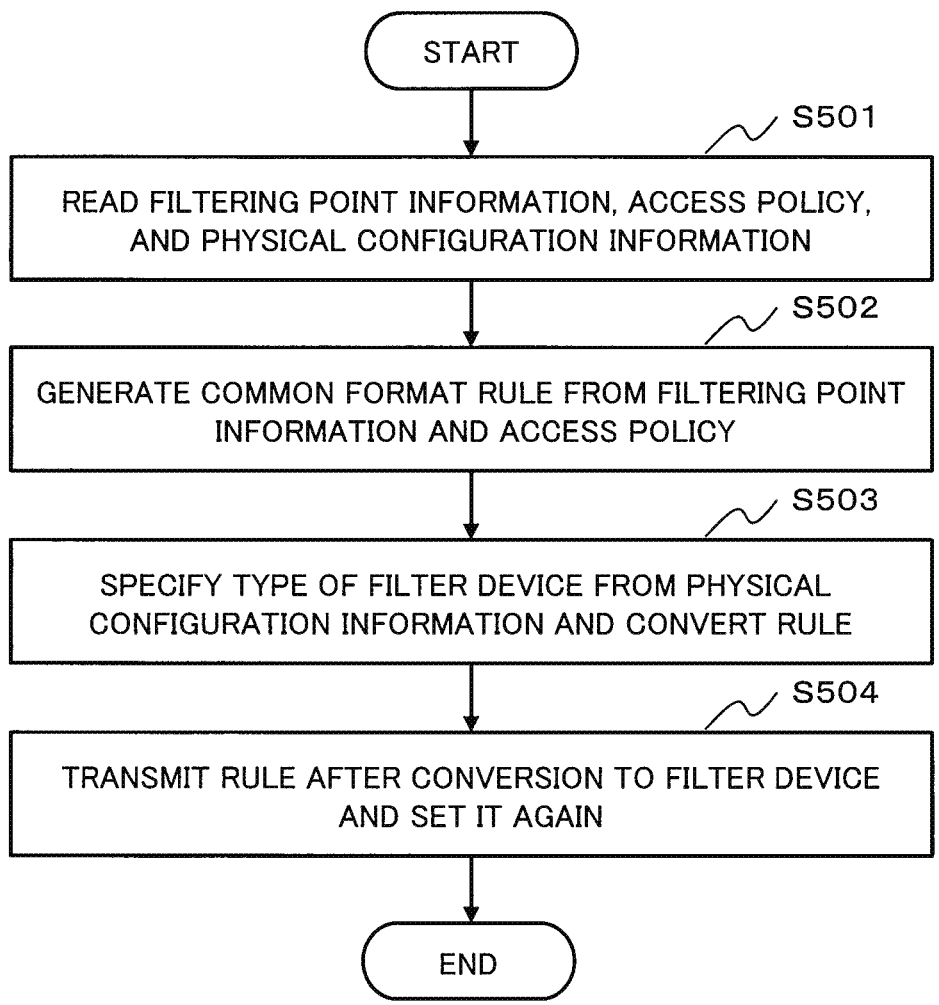

FILTERING SETTING SUPPORT DEVICE, FILTERING SETTING SUPPORT METHOD, AND MEDIUM

TECHNICAL FIELD

Description about Related Application

This application is based upon Japanese patent application No. 2012-163960, filed on Jul. 24, 2012, the contents of which are hereby incorporated by reference in their entirety as if fully set forth herein.

The present invention relates to a filtering setting support device, a filtering setting support method, and a medium. In particular, the present invention relates to a filtering setting support device which supports a network administrator in generating a filtering rule, a filtering setting support method, and a medium.

BACKGROUND ART

In recent years, an intranet which can only be used within the confines of organization is widely used. In the intranet used by a large-scale organization with multiple bases, a filter device needs to be installed in a WAN (Wide Area Network) which connects the bases to each other, at a domain boundary for each department, or the like. More specifically, a filter device such as a firewall, a backbone router with a filtering function, an intelligent switch, or the like is installed to counter the threat of virus invasion, unauthorized access from outside, and the like. As a result, localization of the network damage is realized.

In the network such as the intranet or the like, by setting an appropriate filtering rule to each filter device, the security of the entire intranet is ensured. Here, when an intranet becomes large-scale, the number of filter devices used in the network increases and the type of the filter device also increases. Because the filtering rule needs to be individually set to each filter device, the filtering rule is dispersed and a problem with improper setting or the like occurs.

In patent literature 1, an example of a filtering rule setting support method is disclosed. In the filtering rule setting support method disclosed in patent literature 1, a central filtering rule management device collects the filtering rule set to the filter device that is a management target. After that, by detecting redundancy and inconsistency between the rules by using an access matrix model and generating the filtering rule which does not have redundancy and inconsistency, the central filtering rule management device prompts a network administrator to a proper change of the setting by a network administrator.

In non-patent literature 1, an example of the filtering rule setting support method is disclosed. In the filtering rule setting support method disclosed in non-patent literature 1, a central filtering rule management device collects the filtering rule set to the filter device that is the management target. After that, by simulating an information flow between a client and a server by using a directed graph model, the central filtering rule management device detects the presence of an information leaking path that breaches an information protection policy. By notifying the network administrator of a detected result, the central filtering rule management device prompts the network administrator to a change to more proper setting.

CITATION LIST

Patent Literature

[PLT 1] Japanese Patent Application Laid-Open No. 2006-040247

Non Patent Literature

[NPL 1] H. Sakaki, K. Yanoo, and R. Ogawa, "A Model-Based Method for Security Configuration Verification", Lecture Notes in Computer Science, vol. 4266, pp. 60-75, 2006

SUMMARY OF INVENTION

Technical Problem

Further, the each disclosure of the above-mentioned prior technical literatures is hereby incorporated by reference in its entirety. The following analysis has been made by the inventor et al. of the present invention.

The technologies disclosed in patent literature 1 and non-patent literature 1 are technologies related to the filtering rule setting support. However, it is difficult to apply these technologies to the intranet in which the various types of filter devices are intermingled. In the filtering rule setting support method disclosed in patent literature 1 and non-patent literature 1, it is assumed that the central filtering rule management device can collect the filtering rule in the filter device in a management target network and analyze it.

However, in fact, an interface for collecting the filtering rule and a description method of the filtering rule are greatly different for each product or each vendor. Namely, it cannot be assumed that the central filtering rule management device collects the filtering rule in the filter device in the management target network and analyzes it. Therefore, under the network environment exiting the filter device which has the rule that cannot be automatically collected and be analyzed, a filtering setting support device which contributes to generate the filtering rule suitable for the filter device exhaustively and give a suggestion to the network administrator, a filtering setting support method, and a medium are preferable.

Solution to Problem

According to a first aspect of the present invention, there in provided a filtering setting support device includes: a logical/physical mapping unit which generates mapping information expressing a path on a configuration of a network from a transmission source node to a destination node for each flow identifier by using a combination of a start node and an end node, based on access policy information which manages flow information composed of a combination of the transmission source node and the destination node included in the network with attaching the flow identifiers and based on physical configuration information of the node included in the network; a filtering point analysis unit which specifies the node in which a plurality of flows are intermingled as a filtering point based on the mapping information, a common format rule generation unit which generates a common format rule that should be set to the filtering point from the flow information including the filtering point; and a common format rule output unit which presents the common format rule to an administrator of the network.

According to a second aspect of the present invention, there is provided a filtering setting support method includes: generating mapping information expressing a path on a configuration of a network from a transmission source node to a destination node for each flow identifier by using a combination of a start node and an end node, based on access policy information which manages flow information composed of a combination of the transmission source node and the destination node included in the network with attaching the flow information and based on information about a physical configuration information of the node included in the network; specifying the node in which different flows are intermingled as a filtering point based on the mapping information; generating a common format rule that should be set to the filtering point from the flow information including the filtering point; and presenting the common format rule to an administrator of the network.

According to a third aspect of the present invention, there is provided a computer readable non-transitory medium embodying a program, said program causing a filtering setting support device to perform a method, said method comprising: generating mapping information expressing a path on a configuration of a network from a transmission source node to a destination node for each flow identifier by using a combination of a start node and an end node, based on access policy information which manages flow information composed of a combination of the transmission source node and the destination node included in the network with attaching the flow information and based on physical configuration information of the node included in the network; specifying the node in which different flows are intermingled as a filtering point based on the mapping information; generating a common format rule that should be set to the filtering point from the flow information including the filtering point; and presenting the common format rule to an administrator of the network.

Furthermore, the program can be stored into a computer readable storage medium. The storage medium can be a non-transient medium such as a semi-conductor memory, a hard disk, a magnetic storage medium, and an optical storage medium. The present invention can be realized as a computer program product.

Advantageous Effects of Invention

Based on each aspect of the present invention, under the network environment in which the filter device which has the rule that cannot be automatically collected and be the analyzed exists, a filtering setting support device which contributes to generate the filtering rule suitable for the filter device exhaustively and give a suggestion to the network administrator, a filtering setting support method, and a medium are provided.

BRIEF DESCRIPTION OF DRAWINGS

FIG. 5 A figure showing an example of mapping information

FIG. 8A A figure showing an example of physical configuration information

FIG. 8B A figure showing an example of physical configuration information

FIG. 9 A figure showing an example of a set P(i)

FIG. 18 A flowchart showing an example of operation of the rule setting unit 91

DESCRIPTION OF EMBODIMENTS

First, an outline of an exemplary embodiment will be described by using FIG. 1. Further, in this outline, a drawing reference code is attached to each element as an example for help of understanding and convenience. The description of this outline has no intention of limiting the present invention.

As described above, under the network environment in which the filter device which has the rule that cannot be automatically collected and be analyzed exists, a filtering setting support device which generates the filtering rule suitable for the filter device exhaustively and gives a suggestion to the network administrator is preferable.

Figure 1:
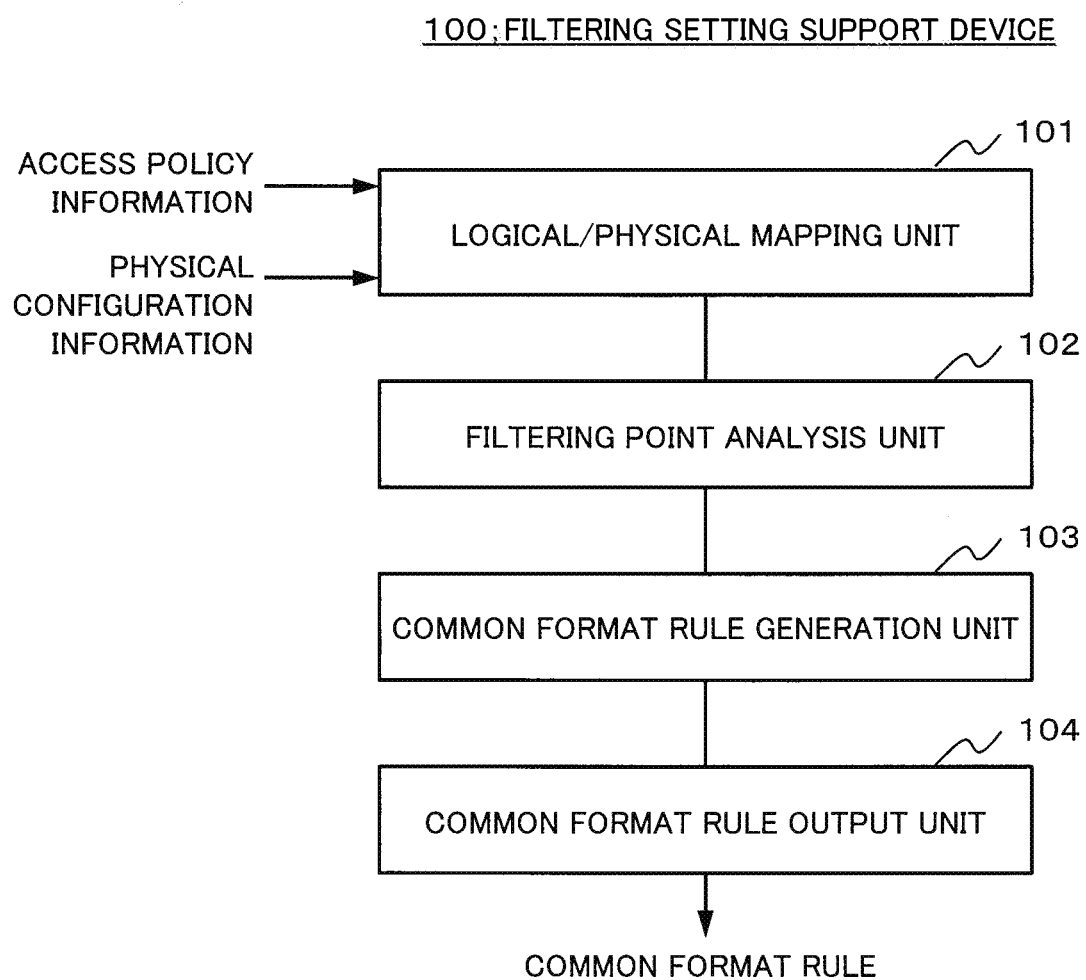
FIG. 1 A figure for explaining an outline of an exemplary embodiment

Accordingly, a filtering setting support device 100 shown in FIG. 1 is provided as an example. A filtering setting support device 100 includes a logical/physical mapping unit 101, a filtering point analysis unit 102, a common format rule generation unit 103 and a common format rule output unit 104. The logical/physical mapping unit 101 generates mapping information expressing a path on a configuration of a network from a transmission source node to a destination node for each flow identifier by using a combination of a start node and an end node based on access policy information which manages flow information composed of a combination of the transmission source node and the destination node included in the network with attaching the flow identifiers and physical configuration information of the node included in the network. The filtering point analysis unit 102 specifies the node in which a plurality of flows are intermingled as a filtering point based on the mapping information. The common format rule generation unit 103 generates a common format rule that should be set to the filtering point from the flow information including the filtering point. The common format rule output unit 104 presents the common format rule to an administrator of the network.

The logical/physical mapping unit 101 generates the mapping information by converting the flow information composed of a combination of location information of the transmission source node and location information of the destination node into a set of paths (arbitrary route from the transmission source node to the destination node) on a configuration of a network. The filtering point analysis unit 102 specifies the node in which a plurality of flows are intermingled by scanning the mapping information as the filtering point. Further, the common format rule generation unit 103 generates the rule that should be set to the each specified filtering point as the common format rule which does not depend on a target device. The generated common format rule is presented to the network administrator by the common format rule output unit 104.

Namely, the logical/physical mapping unit 101 extracts all the paths through which the packet passes when the flow corresponding to communication allowed by access policy information including the flow information occurs. Further, the filtering point analysis unit 102 extracts a node which corresponds to the filter device that sorts the different flows from the path information (mapping information) and separates the flows to destinations as the filtering point. After that, the common format rule generation unit 103 extracts the rule that should be set to the extracted filter device from the access policy information, and the common format rule output unit 104 presents it to the network administrator. As a result, even when the filter device of which the rule cannot be automatically collected, interpreted, and set exists in the management target network, the rule suitable for all the filter devices can be exhaustively generated and presented to the network administrator.

Further, the following embodiment can be realized.

Embodiment 1

It is the same as the filtering setting support device according to the above-mentioned first aspect.

Embodiment 2

It is desirable that the filtering point analysis unit specifies the filtering point by scanning the path on the configuration of the network included in the mapping information from the start node toward the end node.

Embodiment 3

It is desirable that the filtering point analysis unit specifies the filtering point by scanning the path on the configuration of the network included in the mapping information from the end node toward the start node.

Embodiment 4

It is desirable to include a rule setting unit which converts the common format rule into a rule that fits in with the filtering point and sets the converted rule to the filtering point.

Embodiment 5

It is the same as the filtering setting support method according to the above-mentioned second aspect.

Embodiment 6

It is desirable to specify the filtering point by scanning the path on the configuration of the network included in the mapping information from the start node toward the end node.

Embodiment 7

It is desirable to specify the filtering point by scanning the path on the configuration of the network included in the mapping information from the end node toward the start node.

Embodiment 8

It is desirable to include converting the common format rule into a rule that fits in with the filtering point; and setting the converted rule to the filtering point.

Embodiment 9

It is the same as the medium according to the above-mentioned third aspect.

Embodiment 10

It is desirable to specify the filtering point by scanning the path on the configuration of the network included in the mapping information from the start node toward the end node.

Embodiment 11

It is desirable to specify the filtering point by scanning the path on the configuration of the network included in the mapping information from the end node toward the start node.

Embodiment 12

It is desirable to perform converting the common format rule into a rule that fits in with the filtering point; and setting the converted rule to the filtering point.

Concrete exemplary embodiments will be described below in more detail with reference to the drawing.

First Exemplary Embodiment

A first exemplary embodiment will be described in more detail by using the drawing.

Figure 2:
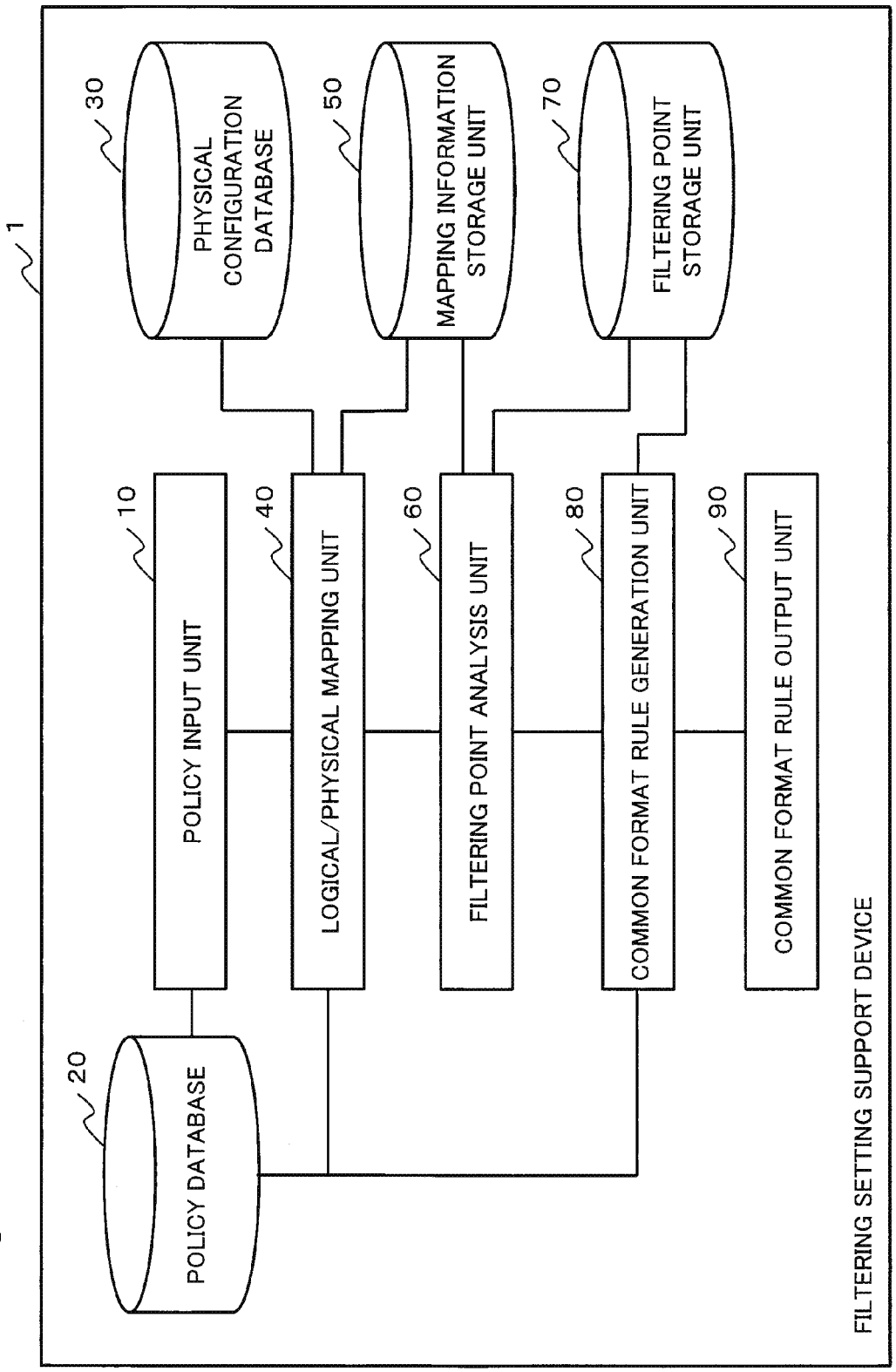
FIG. 2 A figure showing an example of an internal configuration of a filtering setting support device 1 according to a first exemplary embodiment FIG. 3 A figure for explaining operation of the filtering setting support device 1

FIG. 2 is a figure showing an example of an internal configuration of a filtering setting support device 1 according to this exemplary embodiment.

The filtering setting support device 1 includes and is composed of a policy input unit 10, a policy database 20, a physical configuration database 30, a logical/physical mapping unit 40, a mapping information storage unit 50, a filtering point analysis unit 60, a filtering point storage unit 70, a common format rule generation unit 80, and a common format rule output unit 90.

The policy input unit 10 receives an input of an access policy in which a network access control rule is abstractly described. The access policy manages the flow information composed of a combination of the transmission source node and the destination node included in the network with attaching a flow identifier (ID; Identification). More concretely, the flow information is composed of a combination of location information of the transmission source node and location information of the destination node. Further, a MAC (Media Access Control) address, an IP (Internet Protocol) address, or the like can be used for the location information of each node. In the following explanation, the IP address is used for the location information of the node.

The policy database 20 stores the access policy inputted from the policy input unit 10.

The physical configuration database 30 stores physical configuration information of the network. The physical configuration information is information in which a physical structure (a network address, a concrete product name, or the like) of the node included in the target network is described. The physical configuration information will be described later in detail.

The logical/physical mapping unit 40 refers to the flow information and the physical configuration information, and generates the mapping information. The logical/physical mapping unit 40 stores the generated mapping information into the mapping information storage unit 50. The mapping information is information which expresses the path on the configuration of the network from the transmission source node to the destination node for each flow identifier by using the combination of a start node and an end node. Namely, the mapping information is information obtained by projecting the flow between the transmission source node and the destination node on a set of the paths (arbitrary routes from the transmission source node to the destination node that are designated by the flow identifier) on the configuration of the network based on the flow information and the physical configuration information. The mapping information will be described later in detail.

The filtering point analysis unit 60 extracts the node in which a plurality of flows are intermingled as the filtering point by scanning the path included in the mapping information. The filtering point corresponds to the node to which the filtering has to be performed. The filtering point analysis unit 60 stores the extracted filtering point into the filtering point storage unit 70 as the filtering point information.

The common format rule generation unit 80 extracts the flow information corresponding to the path passing through each filtering point based on the access policy and the filtering point information, and generates the common format rule that should be set to the filtering point.

The common format rule output unit 90 presents the common format rule generated by the common format rule generation unit 80 to the network administrator.

Further, each unit included in the filtering setting support device 1 such as the policy input unit 10, the logical/physical mapping unit 40, the filtering point analysis unit 60, the common format rule generation unit 80, the common format rule output unit 90, or the like can be realized by using a computer program (a filtering setting support program) which causes a computer mounted in the filtering setting support device 1 to perform each process described later in detail by using the hardware of the computer.

Next, the operation of the filtering setting support device 1 will be described. Further, in the explanation of the operation of the filtering setting support device 1, it is assumed that a network configuration which supports the filtering setting is as shown in FIG. 3.

Figure 3:
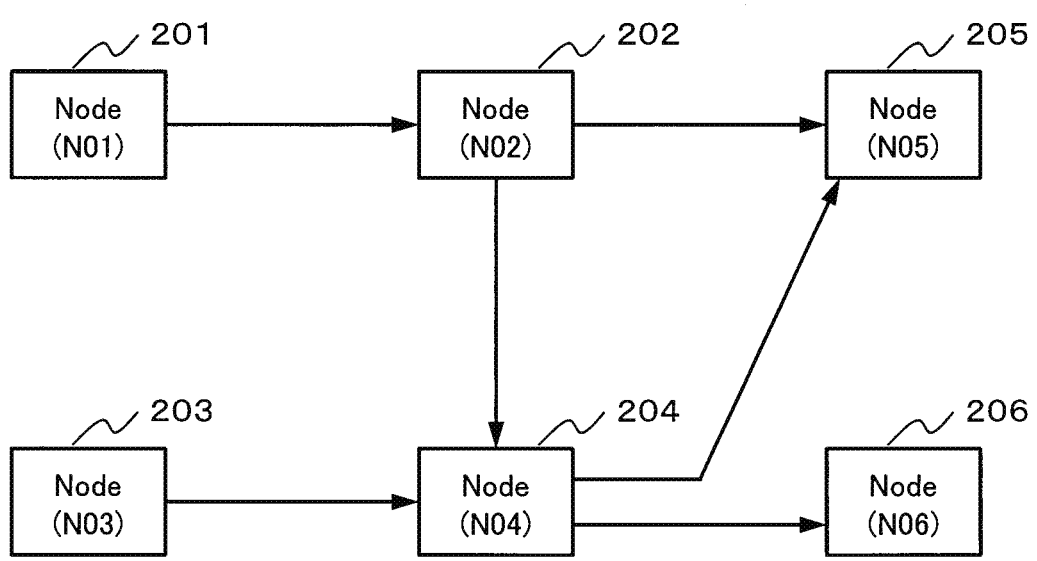

In FIG. 3, nodes 201 to 206 are included. N01 to N06 described in parenthesis of each node are identifiers which identify nodes respectively. For example, the identifier of the node 201 is "N01".

It is assumed that the access policy of the network configuration shown in FIG. 3 allows the communication from the node 201 to the node 205 and allows the communication from the node 203 to the node 206. The filtering setting support device 1 specifies the node of which the filtering setting attention is called to the network administrator according to such access policy and performs that expression. Although described later in detail, in the network configuration shown in FIG. 3, the filtering setting support device 1 displays confirmation of appropriateness related to the filtering setting in the node 204. This is because the node 204 is the node in which the flow from the node 201 to the node 205 and the flow from the node 203 to the node 206 are intermingled (the flows diverge or converge). Because the intermingled flows are controlled by using the filtering (the packet filtering), the node in which the flows are intermingled can be said a node to which some kind of filtering rule has to be set.

Figure 4:
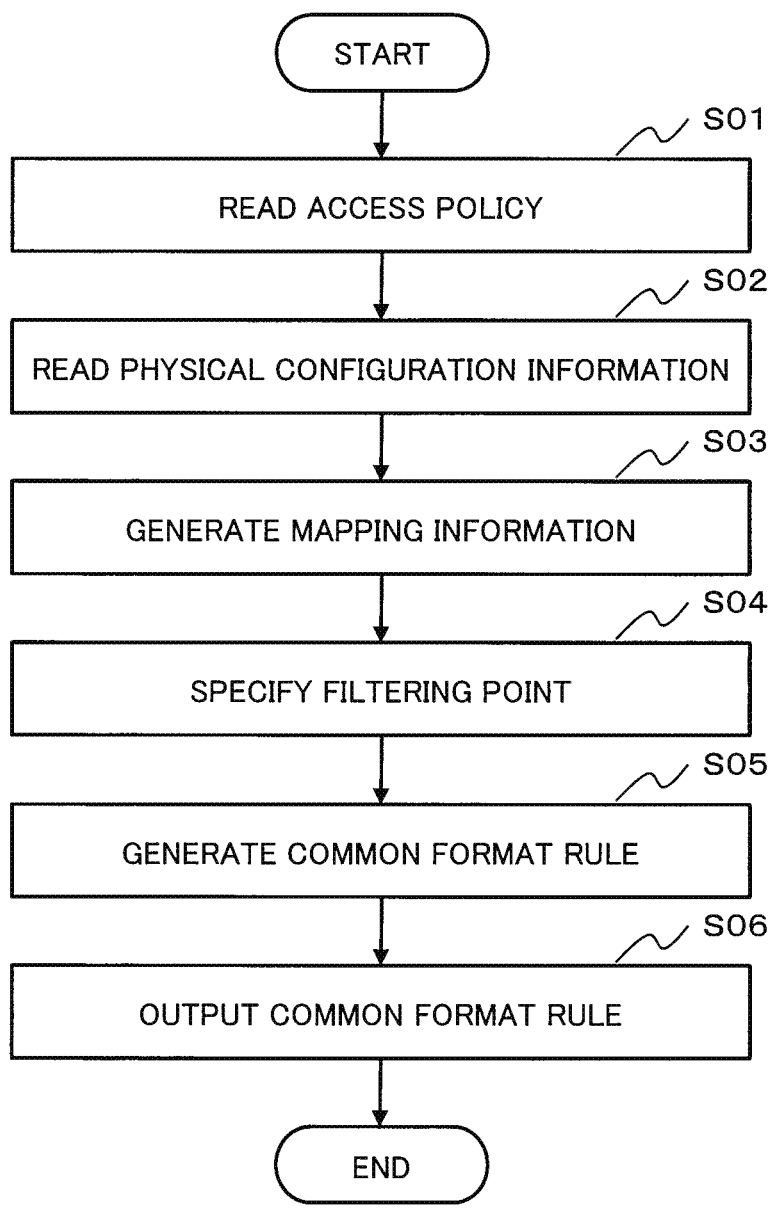
FIG. 4 A flowchart showing an example of operation of the filtering setting support device 1

FIG. 4 is a flowchart showing an example of the operation of the filtering setting support device 1.

The logical/physical mapping unit 40 reads the access policy stored in the policy database 20 and the physical configuration information stored in the physical configuration database 30 (step S01 and step S02). Further, the process of step S01 and the process of step S02 may be performed in reverse order or these processes may be concurrently performed.

In step S03, the logical/physical mapping unit 40 generates the mapping information by referring to the access policy and the physical configuration information. The mapping information is table information in which the identifier of the transmission source node that is the start node of the flow, the identifier of the destination node that is the end node of the flow, and the identifier of the flow information corresponding to the flow are included in one record. Further, the mapping information is a directed graph managed by using the flow identifier.

Figure 6:
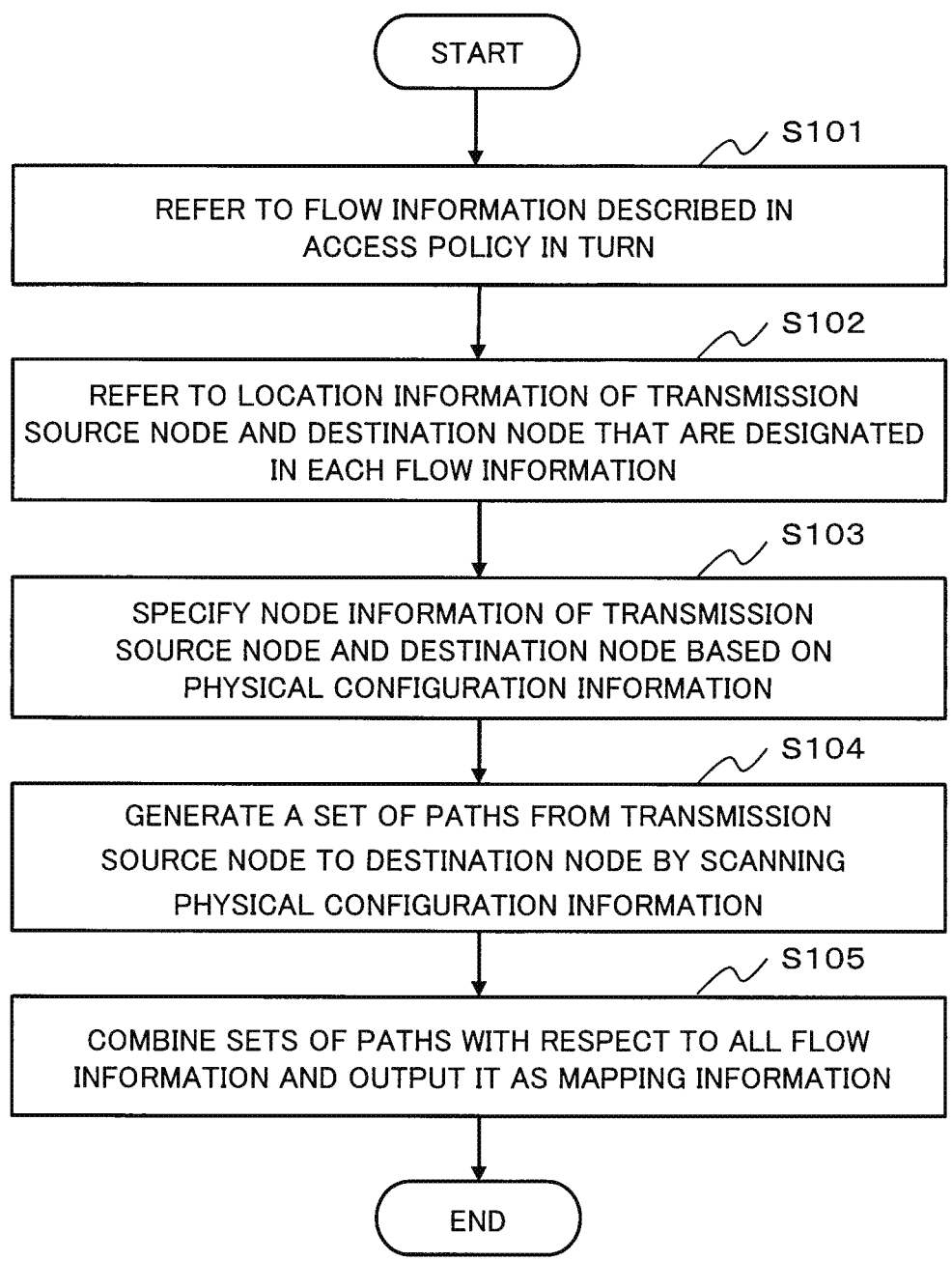
FIG. 6 A flowchart showing an example of a method for generating mapping information FIG. 7 A figure showing an example of an access policy in a network configuration shown in FIG. 3

The mapping information of the network configuration shown in FIG. 3 becomes table information as shown in FIG. 5. Here, the generation of the mapping information will be explained with reference to the flowchart shown in FIG. 6.

In step S101, the logical/physical mapping unit 40 refers to the flow information described in the access policy in turn.

FIG. 7 is a figure showing an example of the access policy in the network configuration shown in FIG. 3. The access policy includes at least the flow identifier, the location information of the transmission source node, and the location information of the destination node. The access policy gathers the above-mentioned information into one record, and is table information composed of a plurality of records.

The logical/physical mapping unit 40 refers to each record from the head of the access policy in turn, and extracts the flow identifier and the flow information. Further, in the following explanation, the flow information in the i-th record is represented as F(i) (where, i is an integer of one or more).

In step S102, the logical/physical mapping unit 40 refers to the location information of the transmission source node and the location information of the destination node that are indicated by the flow information F(i) that is currently referred to.

In step S103, the logical/physical mapping unit 40 specifies the node information that corresponds to the location information of the transmission source node and the location information of the destination node by scanning the physical configuration information. The physical configuration information is a graph showing a state of connection between the nodes included in the network as the arc. The location information and the like of the node on the corresponding network are stored in each node as attribute information.

FIG. 8A and FIG. 8B are figures showing examples of the physical configuration information. For example, the attribute information of each node is managed as the table information shown in FIG. 8A. The arc information is managed as the table information shown in FIG. 8B. Further, the arc information table as shown in FIG. 8B is similar to the flow information in the point composed of a combination of the nodes. However, the contents of the information managed by them are different from each other. Namely, the arc information table prescribes a relation between the physically adjacent nodes. On the other hand, the flow information prescribes a relation between the transmission source node and the destination node that are allowed to communicate. Further, arbitrary information can be used as the identifier of the node included in the physical configuration information if it is unique attribute information which can specify the node.

The logical/physical mapping unit 40 extracts the node which has the location information of the transmission source node and the location information of the destination node as the attribute information from the physical configuration information.

In step S104, the logical/physical mapping unit 40 extracts a set P(i) of the paths from the transmission source node to the destination node by scanning the arc information table of the physical configuration information. More concretely, the logical/physical mapping unit 40 extracts the set P(i) by repeatedly performing a width priority search or a depth priority search in which the transmission source node is treated as a start node and the destination node is treated as an end node.

FIG. 9 is a figure showing an example of the set P(i). Further, the set P(i) is enough to achieve the purpose of supporting the setting of the filtering rule in the point that the set P(i) does not include all the paths from the transmission source node to the destination node, even though any one of the above-mentioned search methods is used, but includes the node (the node to which the filtering setting has to be performed; filtering point) through which the flow has to pass. Therefore, the set P(i) is enough to achieve the purpose of supporting the setting of the filtering rule.

In step S105, the logical/physical mapping unit 40 generates the mapping information by combining the extracted sets P(i) based on all the flow information F(i) (refer to FIG. 5). After that, the logical/physical mapping unit 40 stores the generated mapping information into the mapping information storage unit 50. Further, the logical/physical mapping unit 40 performs the processes from step S102 to step S104 until reference of all the flow information ends.

Next, in step S04 of FIG. 4, the filtering point analysis unit 60 specifies the filtering point by scanning the mapping information stored in the mapping information storage unit 50. After that, the filtering point analysis unit 60 stores the specified filtering point into the filtering point storage unit 70.

Figure 10:
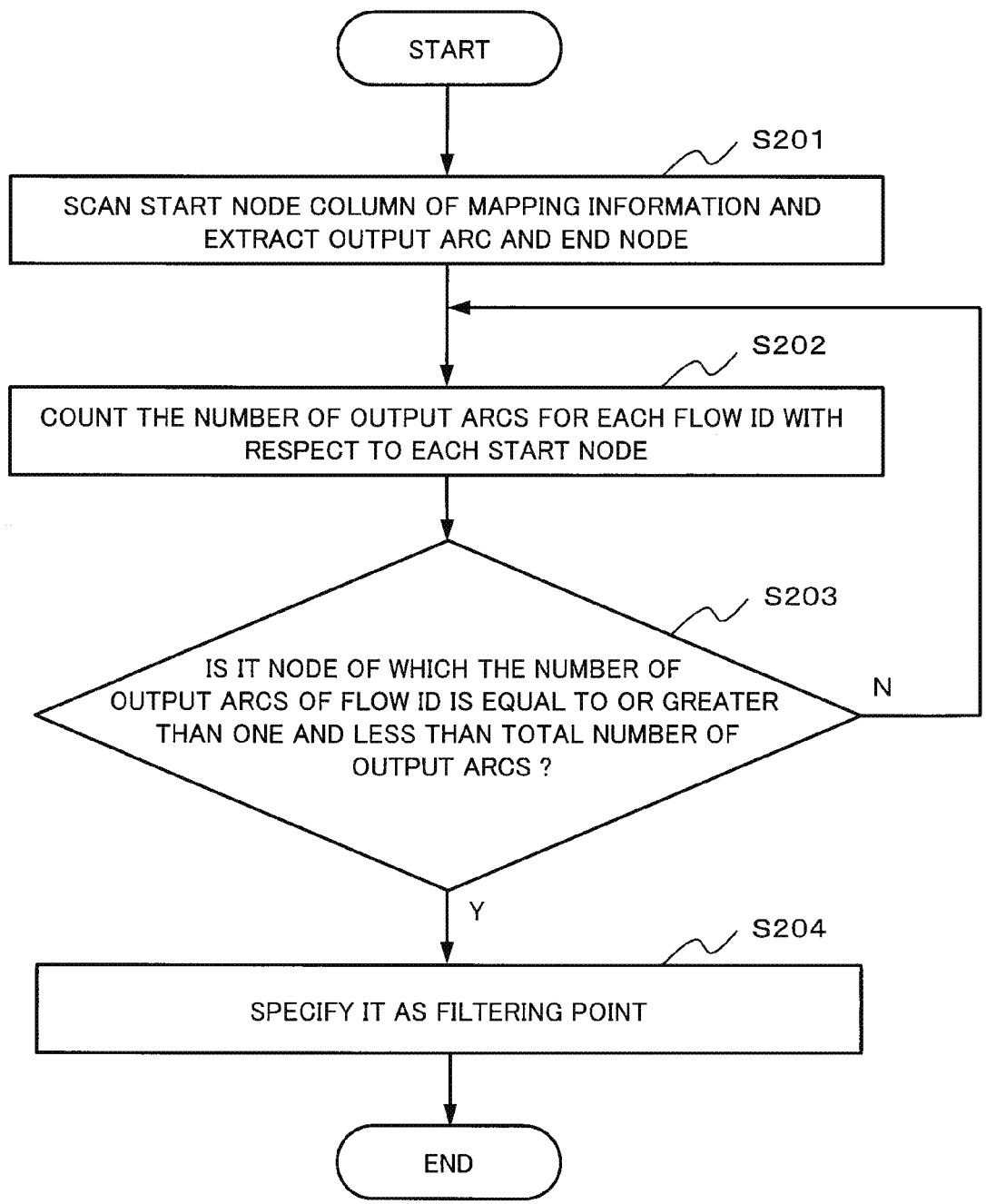
FIG. 10 A flowchart showing an example of a method for specifying a filtering point FIG. 11 A figure showing an example of a relation of an output arc to a start node FIG. 12 A flowchart showing an example of generation of a common format rule FIG. 13 A figure showing an example of a common format rule presented to a network administrator FIG. 14 A flowchart showing an example of a method for specifying a filtering point FIG. 15 A figure showing an example of a relation of an input arc to an end node FIG. 16 A figure showing an example of an internal configuration of a filtering setting support device 3 according to a third exemplary embodiment FIG. 17 A figure showing an example of an internal configuration of a rule setting unit 91

The specification of the filtering point will be explained with reference to the flowchart shown in FIG. 10.

In step S201, the filtering point analysis unit 60 scans a start node column of the mapping information stored in the mapping information storage unit 50, and extracts the output arc of the node and the end node. For example, in the mapping information shown in FIG. 5, the nodes which have N02, N04, N05, and N06 as identifiers are extracted as the end node. Further, the start nodes are the nodes whose node identifiers are N01 to N04.

In step S202, the filtering point analysis unit 60 counts the number of the output arcs for each flow identifier with respect to each start node. For example, the number of the output arcs which had F1 as the flow identifier of the node whose node identifier is N04 is counted as one, and the number of the output arcs which has F2 as the flow identifier of the node is counted as one. Further, the start node that is the transmission source node is not a subject of this step. Namely, in the network configuration shown in FIG. 3, the node 201 and the node 203 are excluded. If the relation between the start node and the output arc in the flow identifier is settled after applying the processes until this step to the mapping information shown in FIG. 5, it becomes as shown in FIG. 11.

In step S203, the filtering point analysis unit 60 determines whether or not the node of which the number of the output arcs of any flow identifier is equal to or greater than one and less than the total number of the output arcs exists with respect to the specific start node.

In step S204, the filtering point analysis unit 60 specifies the node which is determined "the node of which the number of the output arcs of any flow identifier is equal to or greater than one and less than the total number of the output arcs" in the last step as the filtering point. In an example shown in FIG. 11, the node 204 whose node identifier is N04 is specified as the filtering point.

After that, the filtering point analysis unit 60 stores the specified filtering point into the filtering point storage unit 70 as the filtering point information. Further, when the count of the output arcs ends with respect to all the start nodes, the filtering point analysis unit 60 ends the process shown in FIG. 10.

As described above, by performing the processes of step S203 and step S204, the filtering point analysis unit 60 scans the path on the configuration of the network from the start node toward the end node. Namely, the filtering point analysis unit 60 can specify the node in which two or more flows are divided by counting the number of the output arcs with respect to the start node from the mapping information. Further, the node 204 can be said a node in which the flow toward the node 205 and the flow toward the node 206 are divided. This is because when the flow is not divided, the arc is generated in all the adjacent nodes based on the characteristic of the set P(i) of the above-mentioned paths. As described above, because the intermingled flows are controlled by using the filtering (packet filtering), the node in which the flows are intermingled can be said a node to which any filtering rule has to be set.

Next, in step S05 of FIG. 4, the common format rule generation unit 80 generates the rule that should be set to each filtering point mentioned above as a common format rule independent from the target device.

Figure 12:
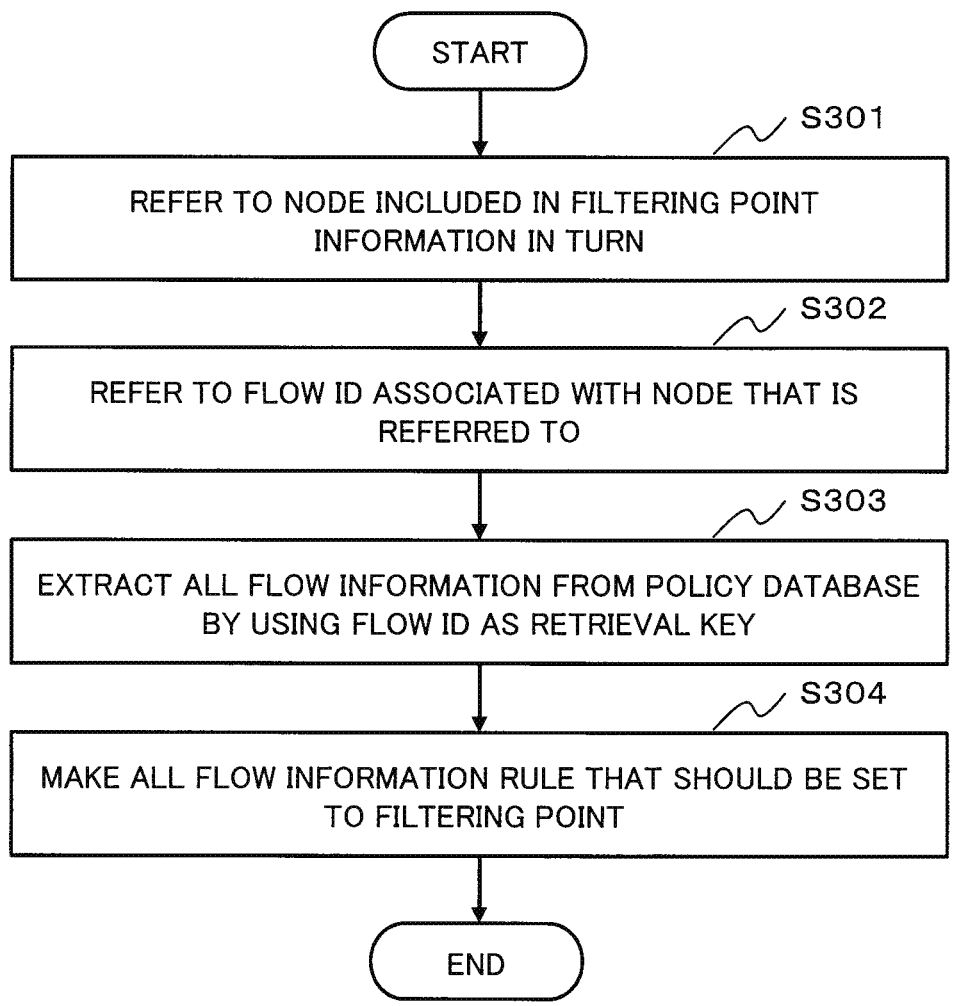

The generation of the common format rule will be described with reference to the flowchart shown in FIG. 12.

In step S301, the common format rule generation unit 80 refers to the node included in the filtering point information stored in the filtering point storage unit 70 in turn. In the above-mentioned example, because the node 204 is included in the filtering point information, the node 204 is selected.

In step S302, the common format rule generation unit 80 specifies the flow identifier associated with the node referred to in the last step. In the above-mentioned example, the flow identifiers associated with the node 204 (whose node identifier is N04) are F01 and F02.

In step S303, the common format rule generation unit 80 extracts the corresponding flow information from the policy database 20 by using the flow identifier specified in the last step as a retrieval key. At this time, because a plurality of the flow identifiers are associated with the node, the common format rule generation unit 80 performs the processes of steps S302 and S303 until all the flow identifiers associated with the node are extracted.

In step S304, the common format rule generation unit 80 makes the extracted flow information the common format rule that should be set to the node selected in step S301.

Next, in step S06 of FIG. 4, the common format rule output unit 90 presents the generated common format rule to the network administrator via an arbitrary display device or an audio output device. At that time, the common format rule output unit 90 presents the common format rule to the network administrator for each filtering point. Here, as for appearance when the flow information is presented, if it is the common format independent from the target device and can be interpreted by the network administrator, any one is acceptable. For example, a table format shown in FIG. 13 is one of the suitable examples. Further, FIG. 13 shows an example of expression which prompts the network administrator to confirm the filtering rule in the node 204.

Further, though it is explained such that the filtering setting support device 1 according to this exemplary embodiment includes each storage unit of the policy database 20, the physical configuration database 30, the mapping information storage unit and the filtering point storage unit 70, it is needless to say that the database server or the like connected to the network can carry the role corresponding to these storage units.

As described above, when the flow corresponding to the communication allowed by the access policy occurs, the logical/physical mapping unit 40 extracts all the paths through which the packet passes. After that, the filtering point analysis unit 60 extracts the node (the filtering point) that corresponds to the filter device to which the filtering rule needs to be set because the flows are intermingled (branched) from the information of the path. Further, the common format rule generation unit 80 generates the rule that should be set to the extracted filtering point from the access policy, and presents it to the network administrator.

As a result, the filtering setting support device 1 according to this exemplary embodiment can extract the filter device required to secure the implementation of the packet filtering based on the given access policy without error, and present the rule that should be set to the filter device.

Second Exemplary Embodiment

Next, a second exemplary embodiment will be described in detail with reference to the drawing.

The filtering setting support device 1 according to the first exemplary embodiment specifies the filtering point by counting the number of the output arcs in each start node. A filtering setting support device 2 according to this exemplary embodiment specifies the filtering point by counting the number of input arcs in each end node. Further, though there is no difference between the internal configuration of the filtering setting support device 1 and the internal configuration of the filtering setting support device 2, the description corresponding to FIG. 2 will be omitted.

Figure 14:
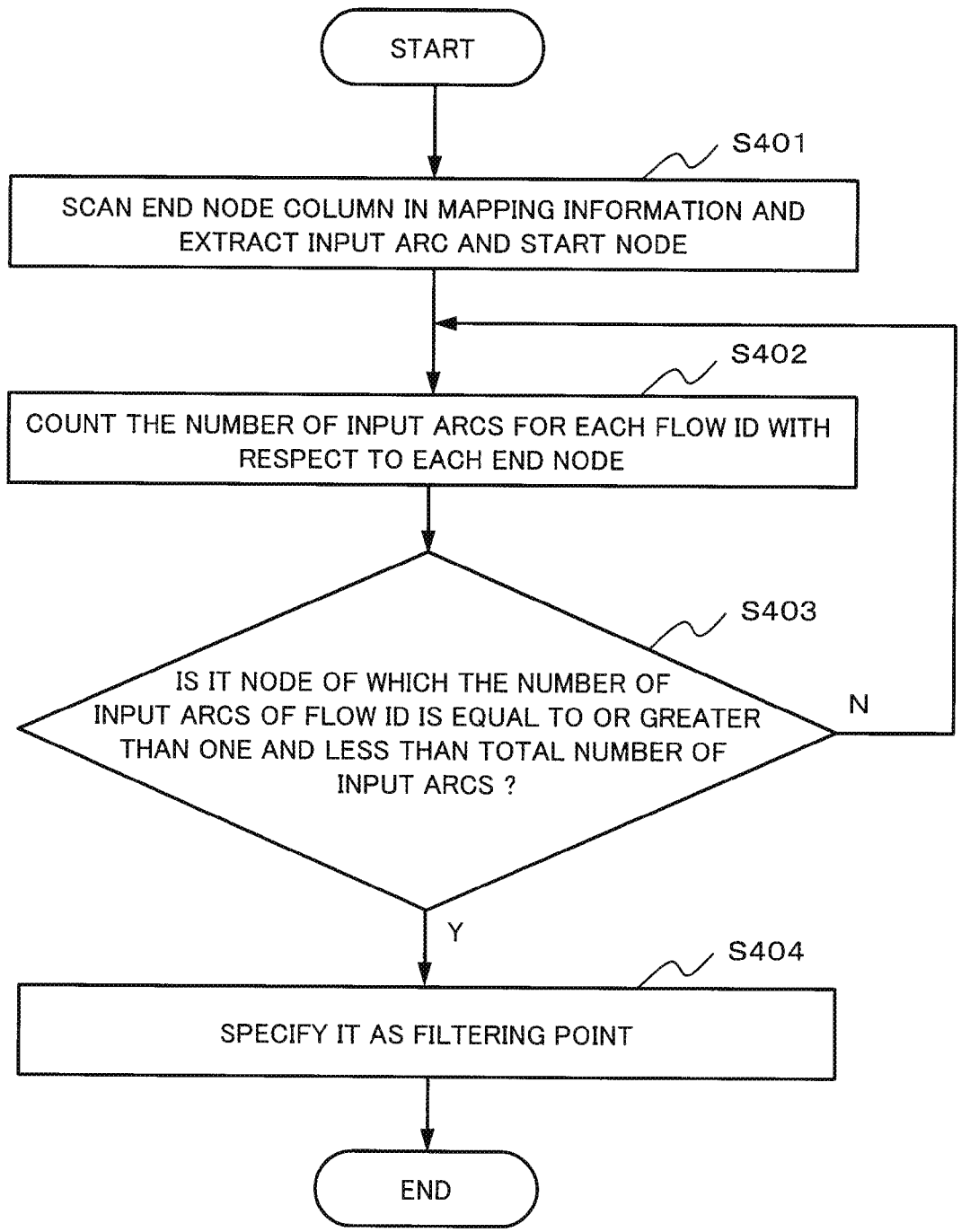

A difference point between the filtering setting support device 1 and the filtering setting support device 2 is a procedure of specifying the filtering point in the filtering point analysis unit 60. Accordingly, the procedure of specifying the filtering point in the filtering point analysis unit 60 will be described with reference to the flowchart shown in FIG. 14.

In step S401, the filtering point analysis unit 60 scans an end node column in the mapping information stored in the mapping information storage unit 50, and extracts the input arc of the end node and the start node. Further, the end node that is the destination node is not a subject of this step. Namely, in the network configuration shown in FIG. 3, the node 205 and the node 206 are excluded.

In step S402, the filtering point analysis unit 60 counts the number of the input arcs for each flow identifier with respect to each end node. If the relation between the end node and the input arc in the flow identifier is settled after applying the processes until this step to the mapping information shown in FIG. 5, it becomes as shown in FIG. 15.

In step S403, the filtering point analysis unit 60 determines whether or not the node of which the number of the input arcs of any flow identifier is equal to or greater than one and less than the total number of the input arcs exists with respect to the specific end node.

In step S404, the filtering point analysis unit 60 specifies the node which is determined "the node of which the number of the input arcs of any flow identifier is equal to or greater than one and less than the total number of the input arcs" in the last step as the filtering point.

Thus, the filtering point analysis unit 60 of the filtering setting support device 2 scans the path on the configuration of the network from the end node toward the start node. Namely, the filtering point analysis unit 60 can specify the node in which two or more flows are combined by counting the number of the input arcs with respect to the end node from the mapping information. Further, the node 204 can be said a node in which the flow from the node 202 is combined with the flow from the node 203.

The filtering setting support device 2 according to this exemplary embodiment can extract the filter device required to secure the implementation of the packet filtering based on the given access policy without error, and present the rule that should be set to the filter device.

Third Exemplary Embodiment

Next, a third exemplary embodiment will be described in detail with reference to the drawing.

Figure 16:
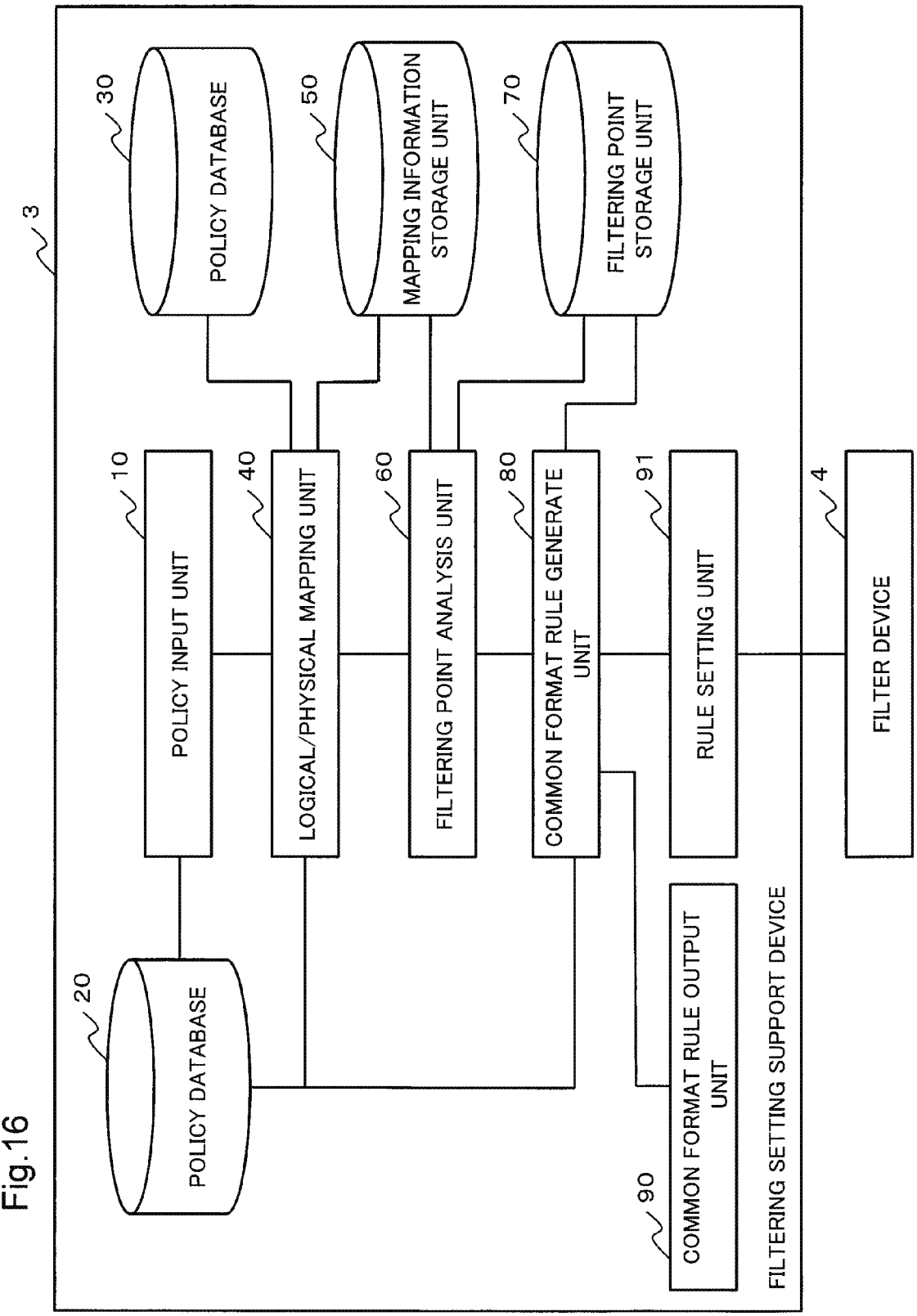

FIG. 16 is a figure showing an example of an internal configuration of a filtering setting support device 3 according to this exemplary embodiment. In FIG. 16, the same reference numbers are used for the elements having the same function as the element shown in FIG. 2 and the description of the elements is omitted. A difference point between the filtering setting support device 1 and the filtering setting support device 3 is that the filtering setting support device 3 includes a rule setting unit 91 which can be connected to a filter device 4. The filtering setting support device 3 automatically sets the rule to a part of or all of the filter devices in the management target network.

Figure 17:
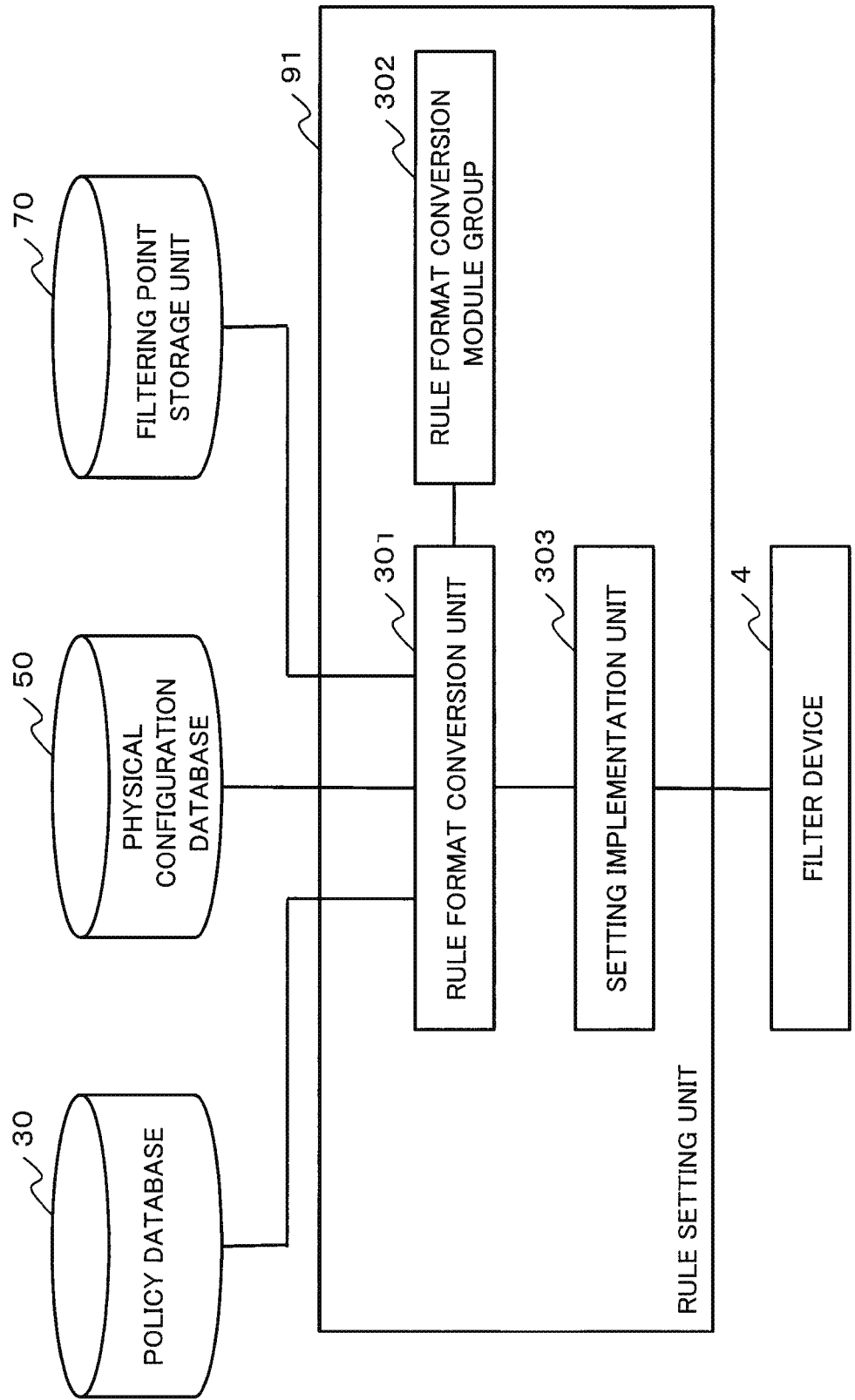

FIG. 17 is a figure showing an example of the internal configuration of the rule setting unit 91.

The rule setting unit 91 includes and is composed of a rule format conversion unit 301, a rule format conversion module group 302, and a setting implementation unit 303.

The rule format conversion unit 301 generates the common format rule by referring to the filtering point information stored in the filtering point storage unit 70 and the access policy stored in the policy database 20. Further, the rule format conversion unit 301 selects a proper conversion module from the rule format conversion module group 302 based on the physical configuration information stored in the physical configuration database 30, and executes it. As a result, the rule format conversion unit 301 converts the common format rule into a rule that fits in with the filter device 4 described in the above-mentioned filtering point information. The rule format conversion unit 301 outputs the converted rule with the location information of the filter device 4 to the setting implementation unit 303.

The rule format conversion module group 302 is a set of the conversion modules prepared for each type of the filter device 4. The conversion module included in the rule format conversion module group 302 receives the input of the identifier expressing the type of the filter device 4 and the common format rule that is a conversion target from the rule format conversion unit 301, and outputs the rule with the format corresponding to the filter device 4.

The setting implementation unit 303 receives the attribute information of the filter device 4 that is received from the rule format conversion unit 301 and the rule that should be set to the device, transmits the rule to the filter device 4 based on the location information of the filter device 4, and changes the setting.

Next, the operation of the rule setting unit 91 will be described.

FIG. 18 is a flowchart showing an example of the operation of the rule setting unit 91.

In step S501, the rule format conversion unit 301 reads the filtering point information stored in the filtering point storage unit 70, the access policy stored in the policy database 20, and the physical configuration information stored in the physical configuration database 30.

In step S502, the rule format conversion unit 301 generates the rule that should be set to the filter device 4 described in the filtering point information from the filtering point information and the access policy as the common format rule. At that case, the specific method for generating the rule may be the same as the method used in the common format rule generation unit 80 mentioned above.

In step S503, the rule format conversion unit 301 refers to the physical configuration information, specifies the type of the filter device 4 described in the filtering point information, inputs the common format rule to the conversion module included in the rule format conversion module group 302 corresponding to the type, and acquires the rule which is converted into the format that can be interpreted by the filter device 4. In the physical configuration information, the location information and the identifier expressing the type of the filter device 4 are stored as the attribute information. The rule format conversion unit 301 specifies the identifier expressing the type of the device by using the location information of the filter device 4 described in the filtering point information as the retrieval key.

In step S504, the setting implementation unit 303 refers to the location information of the filter device 4, and sets the converted rule to the filter device 4 described in the filtering point information via predetermined communication for rule setting. Further, the communication for rule setting in the setting implementation unit 303 may be operated so that the corresponding communication protocol is changed by using the identifier expressing the type of filter devices 4.

Because the filtering setting support device 3 according to this exemplary embodiment automatically sets the rule to the filter device 4 by the operation of the rule setting unit 91 in addition to present the common format rule to the network administrator, a rule setting work can be performed efficiently.

Further, by a filtering setting support program is installed in a storage unit of a computer, the computer can be operated as the filtering setting support device. By the filtering setting support program is executed by the computer, a filtering setting support method can be carried out by the computer.

Further, each disclosure of the above-cited patent literature and the like is hereby incorporated by reference in its entirety. Modification and adjustment of the exemplary embodiment or the example can be made within the scope of the overall disclosure (including claims) of the present invention and based on the basic technical idea of the invention. Moreover, various combinations or selection of the various disclosed elements (including each element of each claim, each element of each exemplary embodiment or each example, and each element or the like of each drawing) can be made within the scope of the claims of the present invention. Namely, the present invention of course includes various deformations and modifications that could be made by those skilled in the art according to the overall disclosure including the claims and the technical idea. In particular, with respect to the range of values described in this specification, even when an arbitrary value or a small range included in the range is not especially described, it should be interpreted that a specific value or range is described.

REFERENCE SIGNS LIST 1 to 3 and 100 filtering setting support device
4 filter device
10 policy input unit
20 policy database
30 physical configuration database
40 and 101 logical/physical mapping unit
50 mapping information storage unit
60 and 102 filtering point analysis unit
70 filtering point storage unit
80 and 103 common format rule generation unit
90 and 104 common format rule output unit
91 rule setting unit
201 to 206 node
301 rule format conversion unit
302 rule format conversion module group
303 setting implementation unit

The invention claimed is:

1. A filtering setting support device, comprising:
an electronic computer device, which includes a processing unit and data storage having stored therein programming code readable by the processing unit, said processing unit, upon executing the programming code, causing the computer device to function as:
a logical/physical mapping unit which generates mapping information expressing a path on a configuration of a network from a transmission source node to a destination node for each flow identifier by using a combination of a start node and an end node, based on access policy information which manages flow information composed of a combination of the transmission source node and the destination node included in the network with attaching the flow identifiers and based on physical configuration information of the node included in the network,
a filtering point analysis unit which specifies the node in which a plurality of flows are intermingled as a filtering point based on a number of arcs, which is extracted from the mapping information,
a common format rule generation unit which generates a common format rule to be set to the filtering point from the flow information including the filtering point, and
a common format rule output unit which presents the common format rule to an administrator of the network.

2. The filtering setting support device according to claim 1, wherein the filtering point analysis unit specifies the filtering point by scanning the path on the configuration of the network included in the mapping information from the start node toward the end node.

3. The filtering setting support device according to claim 1, wherein
the filtering point analysis unit specifies the filtering point by scanning the path on the configuration of the network included in the mapping information from the end node toward the start node.

4. The filtering setting support device according to claim 1, further comprising:
a rule setting unit which converts the common format rule into a rule that fits in with the filtering point and sets the converted rule to the filtering point.

5. A filtering setting support method executed by a computer device, in communication with a network, upon execution of programming code stored on a data storage medium in communication with a processor unit of the computer device, the method comprising the steps of:
generating mapping information that expresses a path on a configuration of the network from a transmission source node to a destination node for each flow identifier, said generating using a combination of a start node and an end node, and based on access policy information which manages flow information composed of a combination of the transmission source node and the destination node included in the network with attaching the flow information and based on information about a physical configuration information of the node included in the network;
determining a number of arcs from the mapping information, and specifying the node in which different flows are intermingled as a filtering point based on the determined number of arcs;
generating a common format rule to be set to the filtering point from the flow information including the filtering point; and
presenting the common format rule to an administrator of the network.

6. The filtering setting support method according to claim 5, wherein
specifying the filtering point by scanning the path on the configuration of the network included in the mapping information from the start node toward the end node.

7. The filtering setting support method according to claim 5, wherein
specifying the filtering point by scanning the path on the configuration of the network included in the mapping information from the end node toward the start node.

8. The filtering setting support method according to claim 5, further comprising:
converting the common format rule into a rule that fits in with the filtering point; and
setting the converted rule to the filtering point.

9. A computer readable non-transitory medium embodying a program, said program causing a filtering setting support device to perform a method, said method comprising:
generating mapping information expressing a path on a configuration of a network from a transmission source node to a destination node for each flow identifier by using a combination of a start node and an end node, based on access policy information which manages flow information composed of a combination of the transmission source node and the destination node included in the network with attaching the flow information and based on physical configuration information of the node included in the network;
specifying the node in which different flows are intermingled as a filtering point based on a number of arcs, which is extracted from the mapping information;
generating a common format rule to be set to the filtering point from the flow information including the filtering point; and
presenting the common format rule to an administrator of the network.

10. The medium according to claim 9, wherein
specifying the filtering point by scanning the path on the configuration of the network included in the mapping information from the start node toward the end node.

11. The filtering setting support device according to claim 2, wherein
the filtering point analysis unit specifies the filtering point by scanning the path on the configuration of the network included in the mapping information from the end node toward the start node.

12. The filtering setting support device according to claim 2, further comprising:
a rule setting unit which converts the common format rule into a rule that fits in with the filtering point and sets the converted rule to the filtering point.

13. The filtering setting support device according to claim 3, further comprising:
a rule setting unit which converts the common format rule into a rule that fits in with the filtering point and sets the converted rule to the filtering point.

14. The filtering setting support method according to claim 6, wherein
specifying the filtering point by scanning the path on the configuration of the network included in the mapping information from the end node toward the start node.

15. The filtering setting support method according to claim 6, further comprising:
converting the common format rule into a rule that fits in with the filtering point; and
setting the converted rule to the filtering point.

16. The filtering setting support method according to claim 7, further comprising:
converting the common format rule into a rule that fits in with the filtering point; and
setting the converted rule to the filtering point.

17. The filtering setting support device according to claim 11, further comprising:
a rule setting unit which converts the common format rule into a rule that fits in with the filtering point and sets the converted rule to the filtering point.

18. The filtering setting support method according to claim 14, further comprising:
converting the common format rule into a rule that fits in with the filtering point; and
setting the converted rule to the filtering point.

19. The filtering setting support method according to claim 5, wherein the common format rule is presented to the administrator of the network by way of either a display device and an audio device operated by the computer device.

* * * * *